United States Patent Office.

IMPROVED MALT EXTRACT.

LEOPOLD HOFF, OF NEW YORK, N. Y.

Letters Patent No. 60,631, dated December 18, 1866.

The Schedule referred to in these Letters Patent and making part of the same.

TO ALL WHOM IT MAY CONCERN:

Be it known that I, LEOPOLD HOFF, of the city, county, and State of New York, have invented a new and improved Malt Extract named "Beer of Health;" and I do hereby declare that the following is a full, clear, and exact description thereof, which will enable others skilled in the art to make the same.

This invention relates to a new beverage which is derived from the extract of barley malt, produced by a peculiar process, and mixed with certain hygienic ingredients, whereby a compound is obtained which, on account of its invigorating and healing qualities, particularly in cases of general debility and consumptive attacks, may properly be termed beer of health.

The malt is produced as follows: I introduce fifty hundredweight of barley in the malt tub, and soak the same with a decoction which has the peculiar quality to favor the change of the grains into malt. This decoction is from fennel boiled in water, which has previously been purified by passing it through sand or coal filters. I use about one pound of fennel to one hundred quarts of water. The decoction is passed through a strainer, and after having cooled off to about fifty-five degrees, I pour it over the barley, which must be perfectly wet. This process is continued for three or four days, then the barley is placed on the malt floor, not, however, in thin strata, but in thick heaps, which must retain, as near as possible, the same shape, and which are turned over every four hours, and constantly moistened with the decoction of fennel. After three days, one-half of these heaps is placed on the drying floor, one-half of the malt being kiln dried, and the other half dried in the open air. By this process the malt is ready in from seven to eight days, while it usually takes from two to four weeks to produce the change. In brewing, I proceed as usual, with the malt prepared as above stated, until the hops are added, and I make one hundred quarts of malt extract from one hundred pounds of malt. The hops are not, as is usually done, introduced in the wort, but they are first mixed and boiled with the following ingredients: hops, three-quarters of a pound; extract cascarillæ, one ounce; extract lysimachiæ purpureæ, one and one-half ounce; extract typhani nigri, one ounce; extract radius dictami albi, one ounce; extract calami aromat., one-half ounce; and a suitable quantity of water. After these ingredients have been distilled, the liquid extract is drawn off and introduced into the wort half an hour before the same is run from the boiler in the cooler, the above quantities being sufficient for one hundred quarts of beer. The beer obtained by these means is left to ferment in the usual way, and it is then left in barrels, and finally filled in bottles ready for use.

Having thus described my invention, I claim as new, and desire to secure by Letters Patent—

1. The within-described process of malting, by soaking the barley with a decoction of fennel instead of plain water, as set forth.

2. The beer of health, obtained by mixing the wort, obtained by the above-named process, with the hygienic ingredients herein set forth.

The above specification of my invention signed by me this 22d day of October, 1866.

LEOPOLD HOFF.

Witnesses:
WM. F. MCNAMARA
W. HAUFF.